United States Patent
Luong et al.

(10) Patent No.: US 11,914,969 B2
(45) Date of Patent: *Feb. 27, 2024

(54) CONTRASTIVE PRE-TRAINING FOR LANGUAGE TASKS

(71) Applicant: Google LLC, Mountain View, CA (US)

(72) Inventors: Thang Minh Luong, Santa Clara, CA (US); Quoc V. Le, Sunnyvale, CA (US); Kevin Stefan Clark, San Francisco, CA (US)

(73) Assignee: GOOGLE LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/947,843

(22) Filed: Sep. 19, 2022

(65) Prior Publication Data

US 2023/0015737 A1 Jan. 19, 2023

Related U.S. Application Data

(63) Continuation of application No. 17/026,780, filed on Sep. 21, 2020, now Pat. No. 11,449,684.

(60) Provisional application No. 62/905,602, filed on Sep. 25, 2019.

(51) Int. Cl.
*G06F 17/00* (2019.01)
*G06F 40/40* (2020.01)
*G06N 5/04* (2023.01)
*G06N 20/00* (2019.01)

(52) U.S. Cl.
CPC .............. *G06F 40/40* (2020.01); *G06N 5/04* (2013.01); *G06N 20/00* (2019.01)

(58) Field of Classification Search
CPC .......... G06F 40/40; G06N 20/00; G06N 5/04
USPC ............................................... 704/9
See application file for complete search history.

(56) References Cited

U.S. PATENT DOCUMENTS

| 10,607,598 B1 | 3/2020 | Larson et al. |
| 2019/0114348 A1 | 4/2019 | Gao et al. |
| 2020/0097820 A1 | 3/2020 | Song et al. |
| 2020/0334416 A1 | 10/2020 | Vianu et al. |

FOREIGN PATENT DOCUMENTS

WO    WO 2018/085728    5/2018

OTHER PUBLICATIONS

Arora et al., "A Theoretical Analysis of Contrastive Unsupervised Representation Learning", 36th International Conference on Machine Learning, Jun. 9-15, 2019, Long Beach, CA, 10 pages.

(Continued)

*Primary Examiner* — Paul C McCord
(74) *Attorney, Agent, or Firm* — Dority & Manning, P.A.

(57) ABSTRACT

Systems and methods are provided that train a machine-learned language encoding model through the use of a contrastive learning task. In particular, the present disclosure describes a contrastive learning task where the encoder learns to distinguish input tokens from plausible alternatives. In some implementations, on each training example the proposed method masks out some subset (e.g., 15%) of the original input tokens, replaces the masked tokens with samples from a "generator" (e.g., which may be a small masked language model), and then trains the encoder to predict whether each token comes from the original data or is a replacement produced by the generator.

20 Claims, 4 Drawing Sheets

(56) References Cited

OTHER PUBLICATIONS

Bordes et al., "Translating Embeddings for Modeling Multi-relational Data", Neural Information Processing Systems, Dec. 5-10, 2013, Lake Tahoe, NV, 9 pages.
Brock et al., "Large Scale GAN Training for High Fidelity Natural Image Synthesis", arXiv: 1809v2, Feb. 25, 2019, 35 pages.
Caccia et al., "Language GANs falling Short", arXiv:1811v6, Feb. 19, 2020, 18 pages.
Callan et al., Clueweb09 Dataset, 2009, https://lemurproject.org/clueweb09/, Retrieved on Mar. 10, 2021, 23 pages.
Cer et al., "SemEval-2017 Task 1: Semantic Textual Similarity Multilingual and Cross-lingual Focused Evaluation", 11th International Workshop on Semantic Evaluations (SemEval-2017), Aug. 3-4, 2017, Vancouver, Canada, 14 pages.
Chopra et al., "Learning a Similarity Metric Discriminatively, with Application to Face Verification", 2005 IEEE Computer Society Conference on Computer Vision and Pattern Recognition (CVPR 2005), Jun. 20-26, 2005, San Diego, CA, 8 pages.
Clark et al., "BAM! Born-Again Multi-Task Networks for Natural Language Understanding", 57th Annual Meeting of the Association for Computational Linguistics, Jul. 28-Aug. 2, 2019, Florence, Italy, pp. 5931-5937.
Clark et al., "ELECTRA: Pre-training Text Encoders as Discriminators Rather than Generators", arXiv:2003.10555v1, Mar. 23, 2020, 18 pages.
Collobert et al., "Natural Language Processing (Almost) from Scratch", Journal of Machine Learning Research, vol. 12, No. 76, 2011, pp. 2493-2537.
Dai et al., "Semi-supervised Sequence Learning", Twenty-ninth Conference on Neural Information Processing Systems (NeurIPS 2015), Dec. 7-12, 2015, Montreal, Canada, 9 pages.
Devlin et al., "BERT: Pre-training of Deep Bidirectional Transformers for Language Understanding" 2019 Annual Conference of the North American Chapter of the Association for Computational Linguistics, Jun. 2-7, 2019, Minneapolis, MN, pp. 4171-4186.
Dolan et al., "Automatically Constructing a Corpus of Sentential Paraphrases", Third International Workshop on Paraphrasing, Oct. 2005, Jeju Island, Korea, pp. 9-16.
Donahue et al., "Adversarial Feature Learning", arXiv:1605.09782v4, Nov. 4, 2016, 17 pages.
Dong et al., "Unified Language Model Pre-training for Natural Language Understanding and Generation", arXiv:1905.03197v3, Oct. 15, 2019, 14 pages.
Fedus et al., "MaskGAN: Better Text Generation Via Filling in the ___", arXiv: 1801.07736v3, Mar. 1, 2018, 17 pages.
Giampiccolo et al., "The Third PASCAL Recognizing Textual Entailment Challenge", Workshop on Textual Entailment and Paraphrasing, Jun. 28-29, 2007, Prague, Czech Republic, 9 pages.
Goodfellow et al., "Generative Adversarial Nets", Twenty-eighth Conference on Neural Information Processing Systems, Dec. 8-13, 2014, Montreal, Canada, 9 pages.
Gutmann et al., "Noise-contrastive estimation: A new estimation principle for unnormalized statistical models", Thirteenth International Conference on Artificial Intelligence and Statistics (AISTATS), May 13-15, 2010, Sardinia, Italy, 8 pages.
Henaff et al., "Data-Efficient Image Recognition with Contrastive Predictive Coding", arXiv:1905.09272v1, May 22, 2019, 11 pages.
Howard et al., "Universal Language Model Fine-tuning for Text Classification", 56th Annual Meeting of the Association for Computational Linguistics, Jul. 15-20, 2018, Melbourne, Australia, pp. 328-339.
International Preliminary Report in Patentability for Application No. PCT/US2020/051754, dated Apr. 7, 2022, 9 pages.
International Search Report and Written Opinion for Application No. PCT/US2020/051754, dated Feb. 1, 2021, 14 pages.
Joshi et al., "SpanBERT: Improving Pre-training by Representing and Predicting Spans", arXiv: 1907.10529v2, Jul. 31, 2019, 12 pages.
Kingma et al., "Adam: A Method for Stochastic Optimization", arXiv:1412.6980v1, Dec. 22, 2014, 9 pages.
Liu et al., "RoBERTa: A Robustly Optimized BERT Pretraining Approach", arXiv:1907.11692v1, Jul. 26, 2019. 13 pages.
Logeswaran et al., "An Efficient Framework for Learning Sentence Representations", arXiv:1803.02893v1, Mar. 7, 2018, 16 pages.
Mikolov et al., "Distributed Representations of Words and Phrases and their Compositionality", Neural Information Processing Systems, Dec. 5-10, 2013, Lake Tahoe, NV, 9 pages.
Mikolov et al., "Efficient Estimation of Word Representations in Vector Space", arXiv:1301.3781v3, Sep. 7, 2013, 12 pages.
Oord et al., "Representation Learning with Contrastive Predictive Coding", arXiv:1807.03748v1, Jul. 10, 2018. 13 pages.
Openai.com, "Improving Language Understanding by Generative Pre-Training", https://cdn.openai.com/research-covers/language-unsupervised/language_understanding_paper.pdf, retrieved on Mar. 10, 2021, 12 pages.
Pennington et al., "GloVe: Global Vectors for Word Representation", 2014 Conference on Empirical Methods in Natural Language Processing (EMNLP), Oct. 25-29, 2014, Doha, Qatar, pp. 1532-1543.
Peters et al., "Deep contextualized word representations", 16th Annual Conference of the North American Chapter of the Association for Computational Linguistics: Human Language Technologies, Jun. 1-6, 2018, New Orleans, LA, pp. 2227-2237.
Phang et al., "Sentence Encoders on STILTs: Supplementary Training on Intermediate Labeled-data Tasks", arXiv: 1811.01088v1, Nov. 2, 2018, 9 pages.
Radford et al., "Unsupervised Representation Learning with Deep Convolutional Generative Adversarial Networks", arXiv:1511.06434v1, Nov. 19, 2015, 15 pages.
Rajpurkar et al., "SQuAD: 100,000+ Questions for Machine Comprehensive of Text", 2016 Conference on Empirical Methods in Natural Language Processing, Nov. 1-5, 2016, Austin, TX, pp. 2383-2392.
Semenuita et al., "On Accurate Evaluation of GANs for Language Generation", arXvi:1806.04936v2, Jun. 14, 2018, 12 pages.
Sermanet et al., "Time-Contrastive Networks: Self-Supervised Learning from Video", arXiv:1704.06888v2, Oct. 6, 2017, 15 pages.
Smith et al., "Contrastive Estimation: Training Log-Linear Models on Unlabeled Data", 43rd Annual Meeting of the Association for Computational Linguistics (ACL'05), Jun. 25-30, 2005, Ann Arbor, Michigan, pp. 354-362.
Socher et al., "Recursive Deep Models for Semantic Compositionality Over a Sentiment Treebank", 2013 Conference on Empirical Methods in Natural Language Processing, Oct. 18-21, 2013, Seattle Washington, pp. 1631-1642.
Song et al., "MASS: Masked Sequence to Sequence Pre-training for Language Generation", arXiv:1906.05743v1, Jun. 13, 2019, 10 pages.
Sun et al., Constrastive Bidirectional Transformer for Temporal Representation Learning, arXiv:1906.05743v1, Jun. 13, 2019, 10 pages.
Sun et al., "ERNIE: Enhanced Representation through Knowledge Integration", arXiv:1904.09223v1, Apr. 19, 2019, 8 pages.
Tevet et al., "Evaluating Text GANs as Language Models", arXiv: 1810.12686v1, Oct. 30, 2018, 6 pages.
Vaswani et al., "Attention is All You Need", arXiv:1706.03762v1, Jun. 12. 2017, 15 pages.
Wang et al., "GLUE: A Multi-Task Benchmark and Analysis Platform for Natural Language Understanding", Seventh International Conference on Learning Representations, May 6-9, 2019, New Orleans, LA, 20 pages.
Warstadt et al., "Neural Network Acceptability Judgments", arXiv:1805.12471v2, Sep. 11, 2018, 12 pages.
Williams et al., "A Broad-Coverage Challenge Corpus for Sentence Understanding through Inference", 16th Annual Conference of the North American Chapter of the Association for Computational Linguistics: Human Language Technologies, Jun. 1-6, 2018, New Orleans, LA, pp. 1112-1122.
Wu et al., "Conditional BERT Contextual Augmentation", Advances in Databases and Information Systems, 2019, pp. 84-95.
Wu et al., "Mask and Infill: Applying Masked Language Model to Sentiment Transfer", arXiv:1908.08039v1, Aug. 21, 2019, 7 pages.

(56) References Cited

OTHER PUBLICATIONS

Yang et al., "XLNet: Generalized Autoregressive Pretraining for Language Understanding", arXiv:1906.08237v1, Jun. 19, 2019, 18 pages.
You et al., "Reducing BERT Pre-Training Time from 3 Days to 76 Minutes", arXiv: 1904.00962v1, Apr. 1, 2019, 15 pages.
Yu et al., "SeqGAN: Sequence Generative Adversarial Nets with Policy Gradient", arXiv:1609.05473v5, Dec. 9, 2016, 10 pages.
Zhang et al., "Adversarial Feature Matching for Text Generation", 34th International Conference on Machine Learning, Aug. 6-11, 2017, Sydney, Australia, 10 pages.
Zhu et al., "Aligning Books and Movies: Towards Story-like Visual Explanations by Watching Movies and Reading Books", 2015 IEEE International Conference on Computer Vision (ICCV), Dec. 7-13, 2015, Santiago, Chile, pp. 19-27.
Zweig et al., "The Microsoft Research Sentence Completion Challenge", 2011.

CONTRASTIVE PRE-TRAINING FOR LANGUAGE TASKS

PRIORITY CLAIM

The present application is a continuation of U.S. application Ser. No. 17/026,780 having a filing date of Sep. 21, 2020, which claims priority to and the benefit of U.S. Provisional Patent Application No. 62/905,602, filed Sep. 25, 2019. Applicant claims priority to and the benefit of each of such applications and incorporate all such applications herein by reference in its entirety.

FIELD

The present disclosure relates generally to natural language processing (NLP). More particularly, the present disclosure relates to techniques for pre-training machine-learned language encoding models.

BACKGROUND

Early works on pre-training text encoders used language modeling objectives. A disadvantage of these methods is that the resulting model is unidirectional—the model does not see future tokens when producing a representation for the current one. Therefore current state-of-the-art pre-training methods primarily rely on masked language modeling (MLM). These approaches select a small subset of the input (typically around 15%), mask the token identities or attention to those tokens, and then train the model to recover the original input. While resulting in bidirectional models, these objectives incur a substantial compute cost. As one example, the significant compute cost can be attributed in part to the fact that the model only learns from 15% of the tokens per example.

Thus, while self-supervised pre-training produces strong results for many NLP tasks, these methods also require large amounts of compute to be effective, raising concerns about their cost and accessibility. As pre-training with more compute almost always results in better accuracy, the present disclosure recognizes that an important consideration for pre-training methods should be compute efficiency rather than absolute downstream accuracy. From this viewpoint, it would be desirable for pre-training algorithms to be substantially more compute-efficient and parameter-efficient.

SUMMARY

Aspects and advantages of embodiments of the present disclosure will be set forth in part in the following description, or can be learned from the description, or can be learned through practice of the embodiments.

One example aspect of the present disclosure is directed to a computer-implemented method to train a machine-learned language encoder model. The method can be performed for each of one or more training iterations. The computer-implemented method includes obtaining, by a computing system including one or more computing devices, an original language input that includes a plurality of original input tokens. The computer-implemented method also includes selecting, by the computing system, one or more of the plurality of original input tokens to serve as one or more masked tokens. The computer-implemented method also includes generating, by the computing system, one or more replacement tokens. The computer-implemented method also includes respectively replacing, by the computing system, the one or more masked tokens in the original language input with the one or more replacement tokens to form a noised language input that includes a plurality of updated input tokens. For example, the plurality of updated input tokens can include a mixture of the one or more replacement tokens and the plurality of original input tokens that were not selected to serve as masked tokens. The computer-implemented method also includes processing, by the computing system, the noised language input with the machine-learned language encoder model to produce a plurality of predictions respectively for the plurality of updated input tokens, where the prediction produced by the machine-learned language encoder model for each updated input token predicts whether such updated input token is one of the original input tokens or one of the replacement input tokens. The computer-implemented method also includes training, by the computing system, the machine-learned language encoder model based at least in part on a loss function that evaluates the plurality of predictions produced by the machine-learned language encoder model. Other embodiments of this aspect include corresponding computer systems, apparatus, and computer programs recorded on one or more computer storage devices, each configured to perform the actions of the methods.

Example implementations may include one or more of the following features.

In some implementations, generating, by the computing system, the one or more replacement tokens includes generating, by the computing system, the one or more replacement tokens using a machine-learned language generator model.

In some implementations, the machine-learned language generator model includes a masked language model that has been trained to predict the one or more masked tokens.

In some implementations, the computer-implemented method further includes: training, by the computing system, the machine-learned language generator model based at least in part on a second loss function that evaluates a difference between the one or more replacement tokens and the one or more masked tokens.

In some implementations, the second loss function includes a maximum likelihood estimation function.

In some implementations, the method further includes: training, by the computing system, the machine-learned language generator model in a reinforcement learning scheme based on a second objective function that evaluates the predictions produced by the machine-learned language encoder model for the replacement tokens generated by machine-learned language generator model.

In some implementations, the method includes jointly training, by the computing system, the machine-learned language generator model and the machine-learned language encoder model based on a combined loss function that includes a combination of the loss function and the second loss function.

In some implementations, one or more weights are shared between the machine-learned language generator model and the machine-learned language encoder model. In some implementations, the machine-learned language encoder model includes a transformer network text encoder.

In some implementations, when one of the replacement tokens is equal to the original token it replaces, the loss function evaluates such replacement token as if it was included in the original input tokens.

In some implementations: the one or more training iterations include one or more pre-training iterations; and the method further includes, after the one or more pre-training iterations: performing one or more fine-tuning training iterations in which the machine-learned language encoder model is trained to perform a language task.

In some implementations, the plurality of original input tokens include a plurality of original words.

In some implementations, the method further includes, prior to the one or more training iterations: individually training, by the computing system, the machine-learned language generator model on the second loss function; and after individually training, by the computing system, the machine-learned language generator model: initializing, by the computing system, the machine-learned language encoder model with weight values based on the machine-learned language generator model.

In some implementations, generating, by the computing system, the one or more replacement tokens includes sampling, by the computing system, the one or more replacement tokens from a noise distribution.

Another general aspect includes a computing system, including: one or more processors. The computing system also includes one or more non-transitory computer-readable media that store a machine-learned language encoder model produced through performance of the method any of the claims. Other embodiments of this aspect include corresponding computer systems, apparatus, and computer programs recorded on one or more computer storage devices, each configured to perform the actions of the methods and/or to store models produced through the actions of the methods. Other aspects of the present disclosure are directed to various systems, apparatuses, non-transitory computer-readable media, user interfaces, and electronic devices.

These and other features, aspects, and advantages of various embodiments of the present disclosure will become better understood with reference to the following description and appended claims. The accompanying drawings, which are incorporated in and constitute a part of this specification, illustrate example embodiments of the present disclosure and, together with the description, serve to explain the related principles.

BRIEF DESCRIPTION OF THE DRAWINGS

Detailed discussion of embodiments directed to one of ordinary skill in the art is set forth in the specification, which makes reference to the appended figures, in which.

Figure 1:
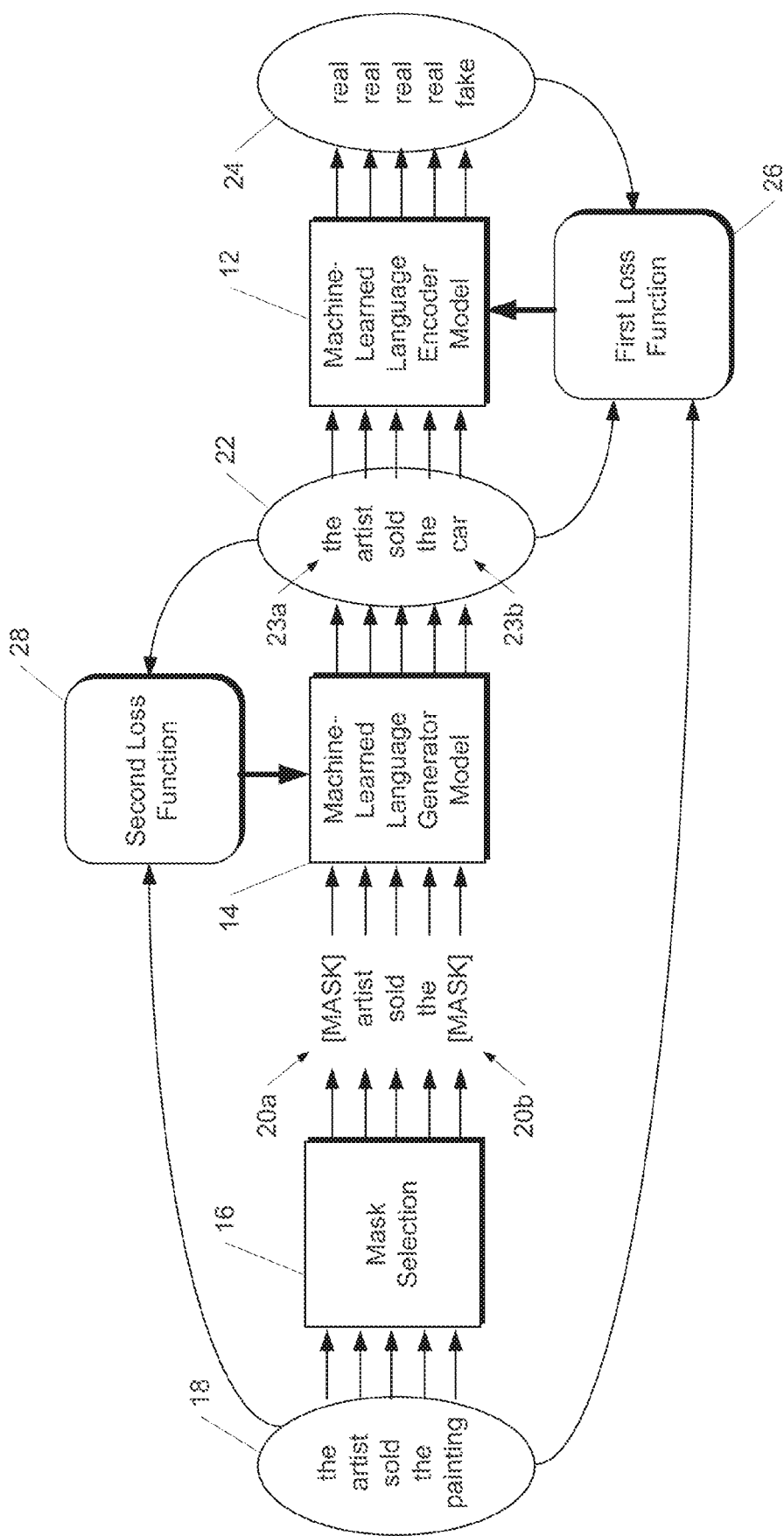
FIG. 1 depicts data flow in an example pretraining process according to example embodiments of the present disclosure.

Reference numerals that are repeated across plural figures are intended to identify the same features in various implementations.

DETAILED DESCRIPTION

Overview

Generally, the present disclosure is directed to systems and methods that train a machine-learned language encoding model through the use of a contrastive learning task. In particular, the present disclosure describes a contrastive learning task where the encoder learns to distinguish input tokens from plausible alternatives. In some implementations, on each training example the proposed method masks out some subset (e.g., 15%) of the original input tokens, replaces the masked tokens with samples from a "generator" (e.g., which may be a small masked language model), and then trains the encoder to predict whether each token comes from the original data or is a replacement produced by the generator. Example experiments contained in U.S. Provisional Patent Application No. 62/905,602 show that this task is more sample efficient than masked language modeling because the loss comes from all input tokens instead of only the subset that was masked out. The proposed approach is also more parameter efficient, producing better results when trained to convergence.

As shown by example experimental data contained in U.S. Provisional Patent Application No. 62/905,602, example models trained through example implementations of the proposed approach substantially outperform methods such as BERT and XLNet given the same model size, data, and compute. While the approach is particularly beneficial for small models, it also works at scale, as indicated by the example experimental results in U.S. Provisional Patent Application No. 62/905,602 which show that an example model according to the present disclosure matches the performance of RoBERTa, the current state-of-the-art pretrained transformer, while using less than ¼ of the compute.

The systems and methods of the present disclosure provide a number of technical effects and benefits. As one example technical effect and benefit, the systems and methods of the present disclosure enable more efficient training of a language encoder model. In particular, as compared to existing masked language modeling techniques, the main representation learning task is posed over all tokens instead of just the masked-out subset, making it more compute-efficient. Thus, for each training example, the encoder model is able to learn from 100% of the input tokens, rather than just a smaller masked out percent (e.g., ~15%). This enables the model to learn (e.g., converge) faster and over fewer training iterations. The use of fewer training iterations to train the model conserves computing resources such as process usage, memory usage, network bandwidth, etc.

As another example technical effect and benefit, the proposed techniques result in improved model performance. In particular, the proposed techniques resolve a mismatch introduced in existing masked language modeling techniques where the model sees artificial [MASK] tokens during pre-training but not during fine-tuning/testing. Alleviating this mismatch results in improved model performance (e.g., accuracy).

With reference now to the Figures, example embodiments of the present disclosure will be discussed in further detail.

Example Training Process

FIG. 1 depicts data flow in an example pretraining process for a machine-learned language encoder model 12 according to example embodiments of the present disclosure.

The process can include obtaining, by a computing system including one or more computing devices, an original language input that includes a plurality of original input tokens 18 ('the', 'artist', 'sold', 'the', 'painting').

The process also includes selecting, by the computing system, one or more of the plurality of original input tokens 18 to serve as one or more masked tokens. In the illustrated example, the original tokens 'the' and 'painting' have been selected to serve as masked tokens, as shown at 20a and 20b.

The process also includes generating, by the computing system, one or more replacement tokens 23a and 23b. The process also includes respectively replacing, by the computing system, the one or more masked tokens 20a and 20b in the original language input with the one or more replacement tokens 23a and 23b to form a noised language input that includes a plurality of updated input tokens 22, where the plurality of updated input tokens 22 includes the one or more replacement tokens 23a and 23b and the plurality of original input tokens 18 that were not selected to serve as masked tokens.

The process also includes processing, by the computing system, the noised language input with the machine-learned language encoder model 12 to produce a plurality of predictions 24 respectively for the plurality of updated input tokens 22, where the prediction 24 produced by the machine-learned language encoder model for each updated input token 22 predicts whether such updated input token is one of the original input tokens 18 or one of the replacement input tokens 23a and 23b.

The process also includes training, by the computing system, the machine-learned language encoder model 12 based at least in part on a loss function 26 that evaluates the plurality of predictions 24 produced by the machine-learned language encoder model 12.

In some implementations, the machine-learned language generator model 14 includes a masked language model that has been trained to predict the one or more masked tokens 20a and 20b.

In some implementations, the process further includes: training, by the computing system, the machine-learned language generator model 14 based at least in part on a second loss function 28 that evaluates a difference between the one or more replacement tokens 23a and 23b and the one or more tokens selected to serve as masked tokens (e.g., 'the' and 'painting').

In some implementations, the second loss function 28 includes a maximum likelihood estimation function.

In some other implementations (not illustrated), the process further includes: training, by the computing system, the machine-learned language generator model 14 in a reinforcement learning scheme based on a second objective function 28 that evaluates the predictions 24 produced by the machine-learned language encoder model 12 for the replacement tokens 23a and 23b generated by machine-learned language generator model 14. For example, the generator model 14 can be rewarded for "fooling" the encoder model 12.

In some implementations, the process includes jointly training, by the computing system, the machine-learned language generator model 14 and the machine-learned language encoder model 12 based on a combined loss function that includes a combination of the loss function 26 and the second loss function 28.

In some implementations, one or more weights are shared between the machine-learned language generator model 14 and the machine-learned language encoder model 12. In some implementations, the machine-learned language encoder model 12 includes a transformer network text encoder as described in Vaswani et al., 2017.

In some implementations, when one of the replacement tokens (e.g., 23a 'the') is equal to the original token it replaces (e.g., 'the' from 18), the loss function 26 evaluates such replacement token 23a as if it was included in the original input tokens 18. For example, the prediction 24 of 'real' for 'the' 23a is considered to be correct.

In some implementations, following the training process illustrated in FIG. 1, the machine-learned language encoder model 12 can be fine-tuned to perform a language processing task. As examples, language processing tasks can include question answering; next word or sentence completion or prediction; translation; entity recognition; language classification; and other language tasks.

Thus, example aspects of the present disclosure are directed to systems and methods for contrastive pre-training. As illustrated in FIG. 1, one example approach trains two models (e.g., neural networks), a generator G 14 and a discriminator D 12. Each one can be or include, for example, an encoder that converts a sequence on input tokens $x=[x_1; x_2; \ldots; x_n]$ into a sequence of contextualized vector representations $h(x)=[h_1; h_2; \ldots; h_n]$. As one example, each encoder can be or include a Transformer network or other network that includes self-attention.

In some implementations, for a given position t (e.g., a position where $x_t$[MASK]), the generator 14 outputs (e.g., using a softmax layer) a probability for generating a particular token $x_t$:

$$p_G(x_t|x) = \exp\left(e(x_t)^T h_G(x)_t\right) / \sum_{x'} \exp\left(e(x')^T h_G(x)_t\right)$$

where e denotes token embeddings. For a given position t, the discriminator 12 predicts whether the token $x_t$ is "real," i.e., that it comes from the data distribution rather than the generator distribution (e.g., a noise distribution). One example discriminator is as follows:

$$D(x,t) = \text{sigmoid}(w^T h_D(x)_t)$$

where w corresponds to learned weights of the discriminator.

The generator 14 can be trained to perform masked language modeling. Given an input $x=[x_1; x_2; \ldots; x_n]$, masked language modeling first selects a random set of positions (integers between 1 and n) to mask out $m=[m_1; \ldots; m_k]$. The tokens in the selected positions are replaced with a [MASK] token: which can be denoted as this as $x^{masked}=\text{REPLACE}(x; m; [\text{MASK}])$. The generator 14 can then learn to maximize the likelihood of the masked-out tokens. The discriminator 12 can be trained to distinguish tokens in the data from tokens sampled from the generator 14. More specifically, a "noised" example $x^{noised}$ 22 can be created by replacing the masked-out tokens 20a and 20b with generator samples. The discriminator 12 can then be trained to predict which tokens in $x^{noised}$ 22 do not match the original input x 18. Formally, example expressions for the inputs (first three equations) and the generator and discriminator losses (final two equations) are:

$$m_i \sim \text{unif}\{1, n\} \text{ for } i = 1 \text{ to } k$$

$$x^{masked} = \text{REPLACE}(x, m, [\text{MASK}])$$

$$\hat{x}_i \sim p_G(x_i|x^{masked}) \text{ for } i \in m$$

$$x^{noised} = \text{REPLACE}(x, m, \hat{x})$$

$$\mathcal{L}_{MLM}(x, \theta_G) = \mathbb{E}\left(\sum_{i \in m} -\log p_G(x_i|x^{masked})\right)$$

-continued $$\mathcal{L}_{Disc}(x, \theta_D) =$$

$$\mathbb{E}\left(\sum_{t=1}^{n} \mathbb{1}\left(x_t^{noised} = x_t\right) \log D(x^{noised}, t) + \mathbb{1}\left(x_t^{noised} \neq x_t\right) \log\left(1 - D(x^{noised}, t)\right)\right)$$

Although similar to the training objective of a GAN, there are several key differences. First, if the generator 14 happens to generate the correct token, that token is considered "real" instead of "fake." This formulation has been found to improve results on downstream tasks. More importantly, in some implementations, the generator 14 is trained with maximum likelihood rather than being trained adversarially to fool the discriminator 12. Adversarially training the generator 12 is challenging because it is impossible to back-propagate through sampling from the generator 14. Lastly, the generator 14 only takes context as inputs while GANs typically also supply the GAN generator with a noise vector.

Thus, one example learning objective is to minimize the combined loss:

$$\min_{\theta_G} \left| \min_{\theta_D} \sum_{x \in X} \mathcal{L}_{MLM}(x, \theta_G) + \lambda \mathcal{L}_{Disc}(x, \theta_D) \right.$$

over a large corpus X of raw text. In some implementations, the expectations in the losses can be approximated with a single sample.

Additional example implementations are as follows.

Weight Sharing: Some example implementations can improve the efficiency of the pre-training by sharing weights between the generator and discriminator. If the generator and discriminator are the same size, all of the encoder weights some or all can be tied. However, it has been found to be particularly efficient to have a small generator, in which case, e.g., only the token embeddings of the generator and discriminator are shared. In this case token embeddings can be used which are the size of the discriminator's hidden states and then linear projection layers can be added to reduce them to the hidden-state-size of the generator. The "input" and "output" embeddings of the generator can be tied as in BERT. Tied token embeddings can be beneficial because masked language modeling is particularly effective at learning token representations: while the discriminator only updates tokens that are present in the input or are sampled by the generator, the generator's softmax over the vocabulary densely updates all token embeddings.

Smaller Generators: If the generator and discriminator are the same size, training the models typically takes around twice as much compute per step as training only with masked language modeling. Therefore some example implementations use a smaller generator to reduce the computational cost of training the generator. Models can be made smaller by decreasing the hidden-layer/embedding sizes while keeping all other hyperparameters constant. Interestingly, using a smaller generator can work better than a larger one even ignoring the difference in compute. One possible reason for this behavior is that having too strong of a generator may pose a too-challenging task for the discriminator, preventing it from learning as effectively.

Training Algorithms: Some example training objectives jointly train the generator and discriminator. Other example training algorithms have the following two-stage training process: 1. Train only the generator with $L_{MLM}$ for n steps. 2. Initialize the weights of the discriminator with the weights of the generator. Then train the discriminator with $L_{Disc}$ for n steps, keeping the generator's weights frozen.

Note that the weight initialization in this procedure requires having the same size for the generator and discriminator. It has been found that without the weight initialization the discriminator would sometimes fail to learn at all beyond the majority class, perhaps because the generator produced such convincing fakes. Joint training on the other hand naturally provides a curriculum for the discriminator where the generator starts off weak but gets better throughout training. Another possible approach trains the generator adversarially as in a GAN, using reinforcement learning to accommodate the discrete operations of sampling from the generator.

After training, the proposed models can be used for a number of different tasks. As examples, classification tasks such as, for example, sentiment analysis can be performed (e.g., by adding a classification layer on top of the model's output). Another example task is question answering in which a system including the model receives a question regarding a text sequence and is required to mark the answer in the sequence. In one example, a Q&A model can be trained by learning two extra vectors that mark the beginning and the end of the answer. In named entity recognition (NER), a system including the model can receive a text sequence and mark the various types of entities (Person, Organization, Date, etc.) that appear in the text. In one example, a NER model can be trained by feeding the output vector of each token into a classification layer that predicts the NER label. Natural language generation is another example task that can be performed (e.g., in furtherance of generating suggested search queries or next word prediction).

Accordingly, the output of the trained language encoder model can be input into one or more neural network layers to perform a natural language processing task, such as classification, question answering or natural language generation. The one or more neural network layers can then output the result of the natural language task (e.g. a classification). A natural language model for the specific natural language task may be trained by fine-tuning the pre-trained language encoder model. The parameters of the pre-trained language encoder model can be input into the untrained natural language model (e.g. a classification model) at initialization. The natural language model can then be trained (e.g. using supervised or unsupervised learning) for its specific (downstream) natural language processing task. The pre-trained language encoder model can therefore be leveraged to more easily and efficiently train the natural language model (e.g. reducing training computation and the required amount of training data and increasing accuracy). The training of the natural language model can train all or some of the parameters of the natural language model. For instance, the training may update all of the parameters, including those of the trained language encoder model, or may only train additional parameters that are added on top of the trained language encoder model.

Example Devices and Systems

Figure 2A:
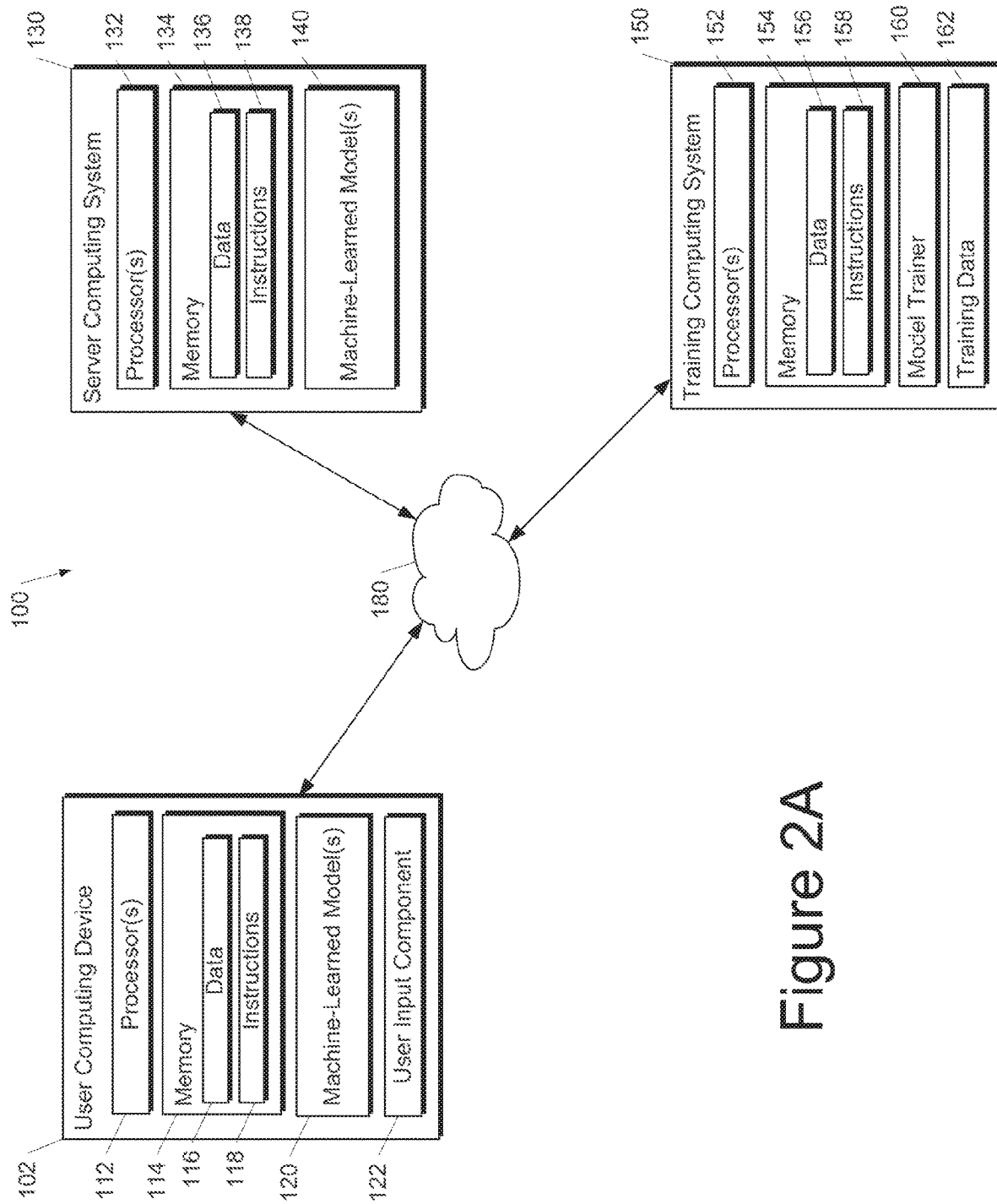
FIG. 2A depicts a block diagram of an example computing system according to example embodiments of the present disclosure.

FIG. 2A depicts a block diagram of an example computing system 100 according to example embodiments of the present disclosure. The system 100 includes a user computing device 102, a server computing system 130, and a training computing system 150 that are communicatively coupled over a network 180.

The user computing device 102 can be any type of computing device, such as, for example, a personal computing device (e.g., laptop or desktop), a mobile computing device (e.g., smartphone or tablet), a gaming console or controller, a wearable computing device, an embedded computing device, or any other type of computing device.

The user computing device 102 includes one or more processors 112 and a memory 114. The one or more processors 112 can be any suitable processing device (e.g., a processor core, a microprocessor, an ASIC, a FPGA, a controller, a microcontroller, etc.) and can be one processor or a plurality of processors that are operatively connected. The memory 114 can include one or more non-transitory computer-readable storage mediums, such as RAM, ROM, EEPROM, EPROM, flash memory devices, magnetic disks, etc., and combinations thereof. The memory 114 can store data 116 and instructions 118 which are executed by the processor 112 to cause the user computing device 102 to perform operations.

In some implementations, the user computing device 102 can store or include one or more machine-learned models 120. For example, the machine-learned models 120 can be or can otherwise include various machine-learned models such as neural networks (e.g., deep neural networks) or other types of machine-learned models, including non-linear models and/or linear models. Neural networks can include feed-forward neural networks, recurrent neural networks (e.g., long short-term memory recurrent neural networks), convolutional neural networks or other forms of neural networks. Example machine-learned models 120 are discussed with reference to FIG. 1.

In some implementations, the one or more machine-learned models 120 can be received from the server computing system 130 over network 180, stored in the user computing device memory 114, and then used or otherwise implemented by the one or more processors 112. In some implementations, the user computing device 102 can implement multiple parallel instances of a single machine-learned model 120 (e.g., to perform parallel language encoding/processing across multiple instances of language tokens).

Additionally or alternatively, one or more machine-learned models 140 can be included in or otherwise stored and implemented by the server computing system 130 that communicates with the user computing device 102 according to a client-server relationship. For example, the machine-learned models 140 can be implemented by the server computing system 140 as a portion of a web service (e.g., a language processing service service). Thus, one or more models 120 can be stored and implemented at the user computing device 102 and/or one or more models 140 can be stored and implemented at the server computing system 130.

The user computing device 102 can also include one or more user input component 122 that receives user input. For example, the user input component 122 can be a touch-sensitive component (e.g., a touch-sensitive display screen or a touch pad) that is sensitive to the touch of a user input object (e.g., a finger or a stylus). The touch-sensitive component can serve to implement a virtual keyboard. Other example user input components include a microphone, a traditional keyboard, or other means by which a user can provide user input.

The server computing system 130 includes one or more processors 132 and a memory 134. The one or more processors 132 can be any suitable processing device (e.g., a processor core, a microprocessor, an ASIC, a FPGA, a controller, a microcontroller, etc.) and can be one processor or a plurality of processors that are operatively connected. The memory 134 can include one or more non-transitory computer-readable storage mediums, such as RAM, ROM, EEPROM, EPROM, flash memory devices, magnetic disks, etc., and combinations thereof. The memory 134 can store data 136 and instructions 138 which are executed by the processor 132 to cause the server computing system 130 to perform operations.

In some implementations, the server computing system 130 includes or is otherwise implemented by one or more server computing devices. In instances in which the server computing system 130 includes plural server computing devices, such server computing devices can operate according to sequential computing architectures, parallel computing architectures, or some combination thereof.

As described above, the server computing system 130 can store or otherwise include one or more machine-learned models 140. For example, the models 140 can be or can otherwise include various machine-learned models. Example machine-learned models include neural networks or other multi-layer non-linear models. Example neural networks include feed forward neural networks, deep neural networks, recurrent neural networks, and convolutional neural networks. Example models 140 are discussed with reference to FIG. 1.

The user computing device 102 and/or the server computing system 130 can train the models 120 and/or 140 via interaction with the training computing system 150 that is communicatively coupled over the network 180. The training computing system 150 can be separate from the server computing system 130 or can be a portion of the server computing system 130.

The training computing system 150 includes one or more processors 152 and a memory 154. The one or more processors 152 can be any suitable processing device (e.g., a processor core, a microprocessor, an ASIC, a FPGA, a controller, a microcontroller, etc.) and can be one processor or a plurality of processors that are operatively connected. The memory 154 can include one or more non-transitory computer-readable storage mediums, such as RAM, ROM, EEPROM, EPROM, flash memory devices, magnetic disks, etc., and combinations thereof. The memory 154 can store data 156 and instructions 158 which are executed by the processor 152 to cause the training computing system 150 to perform operations. In some implementations, the training computing system 150 includes or is otherwise implemented by one or more server computing devices.

The training computing system 150 can include a model trainer 160 that trains the machine-learned models 120 and/or 140 stored at the user computing device 102 and/or the server computing system 130 using various training or learning techniques, such as, for example, backwards propagation of errors. For example, a loss function can be back-propagated through the model(s) to update one or more parameters of the model(s) (e.g., based on a gradient of the loss function). Various loss functions can be used such as mean squared error, likelihood loss, cross entropy loss, hinge loss, and/or various other loss functions. Gradient descent techniques can be used to iteratively update the parameters over a number of training iterations.

In some implementations, performing backwards propagation of errors can include performing truncated back-propagation through time. The model trainer 160 can perform a number of generalization techniques (e.g., weight decays, dropouts, etc.) to improve the generalization capability of the models being trained.

In particular, the model trainer 160 can train the machine-learned models 120 and/or 140 based on a set of training data 162. The training data 162 can include, for example, sets of example input tokens.

In some implementations, if the user has provided consent, the training examples can be provided by the user computing device 102. Thus, in such implementations, the model 120 provided to the user computing device 102 can be trained by the training computing system 150 on user-specific data received from the user computing device 102. In some instances, this process can be referred to as personalizing the model.

The model trainer 160 includes computer logic utilized to provide desired functionality. The model trainer 160 can be implemented in hardware, firmware, and/or software controlling a general purpose processor. For example, in some implementations, the model trainer 160 includes program files stored on a storage device, loaded into a memory and executed by one or more processors. In other implementations, the model trainer 160 includes one or more sets of computer-executable instructions that are stored in a tangible computer-readable storage medium such as RAM hard disk or optical or magnetic media.

The network 180 can be any type of communications network, such as a local area network (e.g., intranet), wide area network (e.g., Internet), or some combination thereof and can include any number of wired or wireless links. In general, communication over the network 180 can be carried via any type of wired and/or wireless connection, using a wide variety of communication protocols (e.g., TCP/IP, HTTP, SMTP, FTP), encodings or formats (e.g., HTML, XML), and/or protection schemes (e.g., VPN, secure HTTP, SSL).

FIG. 2A illustrates one example computing system that can be used to implement the present disclosure. Other computing systems can be used as well. For example, in some implementations, the user computing device 102 can include the model trainer 160 and the training dataset 162. In such implementations, the models 120 can be both trained and used locally at the user computing device 102. In some of such implementations, the user computing device 102 can implement the model trainer 160 to personalize the models 120 based on user-specific data.

Figure 2B:
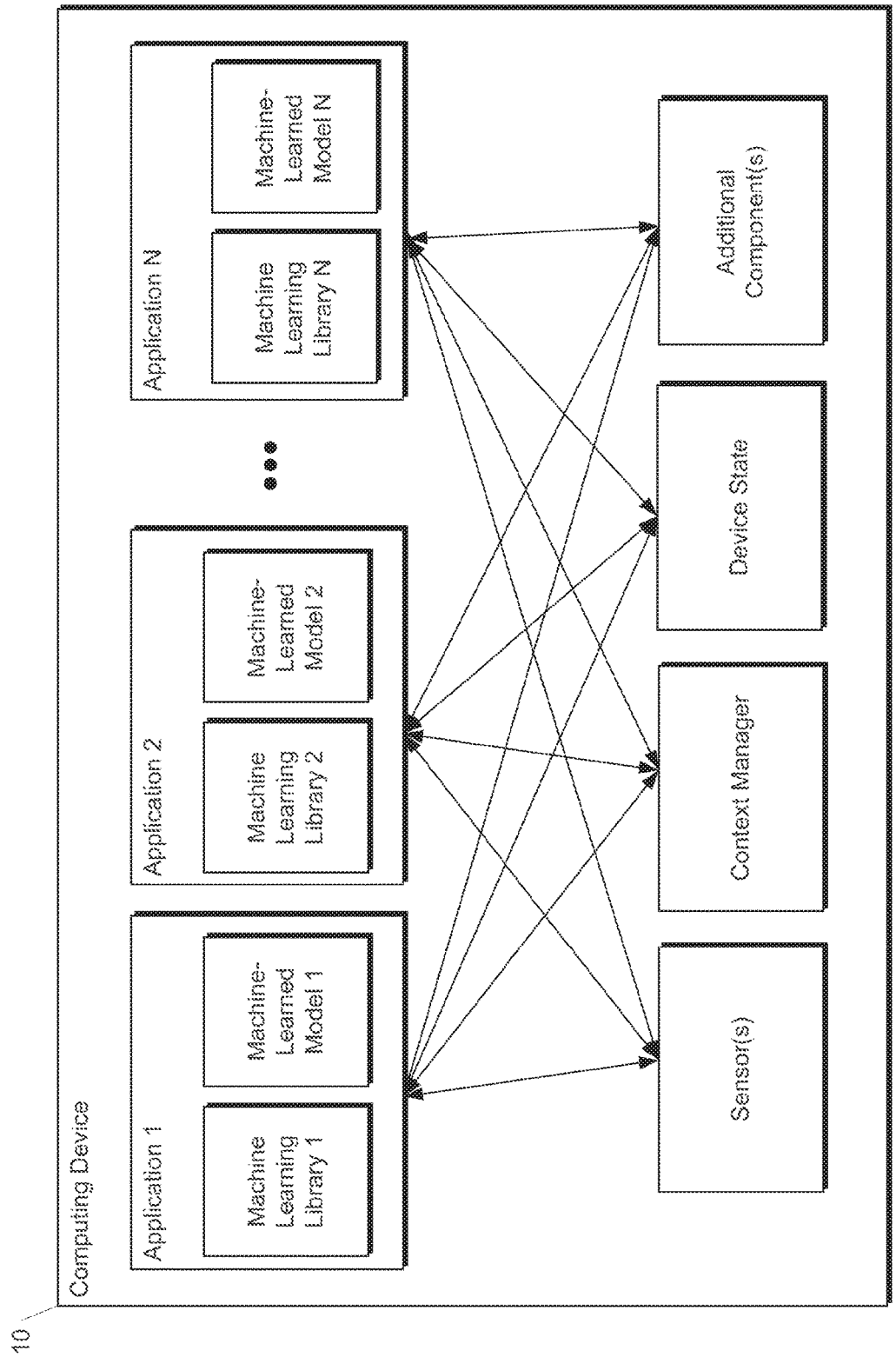
FIG. 2B depicts a block diagram of an example computing device according to example embodiments of the present disclosure.

FIG. 2B depicts a block diagram of an example computing device 10 that performs according to example embodiments of the present disclosure. The computing device 10 can be a user computing device or a server computing device.

The computing device 10 includes a number of applications (e.g., applications 1 through N). Each application contains its own machine learning library and machine-learned model(s). For example, each application can include a machine-learned model. Example applications include a text messaging application, an email application, a dictation application, a virtual keyboard application, a browser application, etc.

As illustrated in FIG. 2B, each application can communicate with a number of other components of the computing device, such as, for example, one or more sensors, a context manager, a device state component, and/or additional components. In some implementations, each application can communicate with each device component using an API (e.g., a public API). In some implementations, the API used by each application is specific to that application.

Figure 2C:
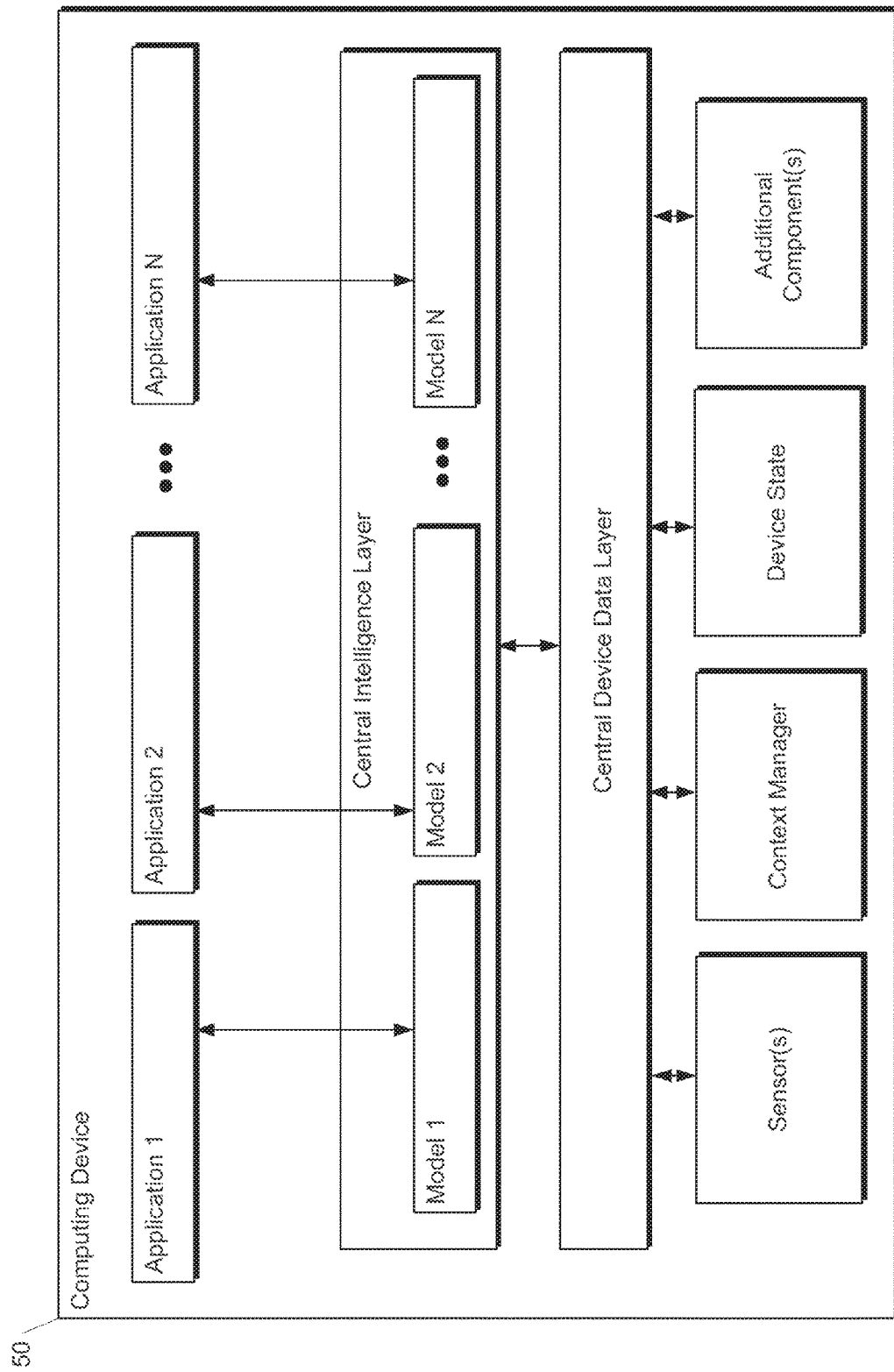
FIG. 2C depicts a block diagram of an example computing device according to example embodiments of the present disclosure.

FIG. 2C depicts a block diagram of an example computing device 50 that performs according to example embodiments of the present disclosure. The computing device 50 can be a user computing device or a server computing device.

The computing device 50 includes a number of applications (e.g., applications 1 through N). Each application is in communication with a central intelligence layer. Example applications include a text messaging application, an email application, a dictation application, a virtual keyboard application, a browser application, etc. In some implementations, each application can communicate with the central intelligence layer (and model(s) stored therein) using an API (e.g., a common API across all applications).

The central intelligence layer includes a number of machine-learned models. For example, as illustrated in FIG. 2C, a respective machine-learned model (e.g., a model) can be provided for each application and managed by the central intelligence layer. In other implementations, two or more applications can share a single machine-learned model. For example, in some implementations, the central intelligence layer can provide a single model (e.g., a single model) for all of the applications. In some implementations, the central intelligence layer is included within or otherwise implemented by an operating system of the computing device 50.

The central intelligence layer can communicate with a central device data layer. The central device data layer can be a centralized repository of data for the computing device 50. As illustrated in FIG. 2C, the central device data layer can communicate with a number of other components of the computing device, such as, for example, one or more sensors, a context manager, a device state component, and/or additional components. In some implementations, the central device data layer can communicate with each device component using an API (e.g., a private API).

Additional Disclosure

The technology discussed herein makes reference to servers, databases, software applications, and other computer-based systems, as well as actions taken and information sent to and from such systems. The inherent flexibility of computer-based systems allows for a great variety of possible configurations, combinations, and divisions of tasks and functionality between and among components. For instance, processes discussed herein can be implemented using a single device or component or multiple devices or components working in combination. Databases and applications can be implemented on a single system or distributed across multiple systems. Distributed components can operate sequentially or in parallel.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. Implementations of the described techniques may include hardware, a method or process, or computer software on a computer-accessible medium.

While the present subject matter has been described in detail with respect to various specific example embodiments thereof, each example is provided by way of explanation, not limitation of the disclosure. Those skilled in the art, upon attaining an understanding of the foregoing, can readily produce alterations to, variations of, and equivalents to such embodiments. Accordingly, the subject disclosure does not preclude inclusion of such modifications, variations and/or additions to the present subject matter as would be readily apparent to one of ordinary skill in the art. For instance, features illustrated or described as part of one embodiment can be used with another embodiment to yield a still further embodiment. Thus, it is intended that the present disclosure cover such alterations, variations, and equivalents.

What is claimed is:

1. A computer-implemented method to perform inference with a machine-learned language encoder model, the method comprising:
   processing an input with the machine-learned language encoder model to generate an output;
   wherein the machine-learned language encoder model has been previously trained for one or more training iterations, each of the one or more training iterations comprising:
      obtaining an original language input that comprises a plurality of original input tokens;
      selecting one or more of the plurality of original input tokens to serve as one or more masked tokens;
      generating one or more replacement tokens, wherein the one or more replacement tokens comprise alternative natural language tokens;
      respectively replacing the one or more masked tokens in the original language input with the one or more replacement tokens to form a noised language input that comprises a plurality of updated input tokens, the plurality of updated input tokens comprising a mixture of the one or more replacement tokens and the original input tokens that were not selected to serve as masked tokens;
      processing the noised language input with the machine-learned language encoder model to produce a respective prediction for each updated input token included in the plurality of updated input tokens, wherein the prediction produced by the machine-learned language encoder model for each updated input token predicts whether such updated input token is one of the original input tokens or one of the replacement input tokens; and
      training the machine-learned language encoder model based at least in part on a loss function that evaluates the plurality of predictions produced by the machine-learned language encoder model.

2. The computer-implemented method of claim 1, wherein generating the one or more replacement tokens comprises generating the one or more replacement tokens using a machine-learned language generator model.

3. The computer-implemented method of claim 2, wherein the machine-learned language generator model comprises a masked language model that has been trained to predict the one or more masked tokens.

4. The computer-implemented method of claim 2, each training iteration further comprising:
   training the machine-learned language generator model based at least in part on a second loss function that evaluates a difference between the one or more replacement tokens and the one or more original tokens selected to serve as masked tokens.

5. The computer-implemented method of claim 4, wherein the second loss function comprises a maximum likelihood estimation function.

6. The computer-implemented method of claim 4, wherein the machine-learned language generator model and the machine-learned language encoder model have been jointly trained based on a combined loss function that comprises a combination of the loss function and the second loss function.

7. The computer-implemented method of claim 4, wherein:
   prior to the one or more training iterations, the machine-learned language generator model was trained on the second loss function; and
   after individually training the machine-learned language generator model, the machine-learned language encoder model was initialized with weight values based on the machine-learned language generator model.

8. The computer-implemented method of claim 2, wherein the machine-learned language generator model has been trained in a reinforcement learning scheme based on a second objective function that evaluates the predictions produced by the machine-learned language encoder model for the replacement tokens generated by machine-learned language generator model.

9. The computer-implemented method of claim 2, wherein one or more weights were shared between the machine-learned language generator model and the machine-learned language encoder model.

10. The computer-implemented method of claim 1, wherein generating the one or more replacement tokens comprises sampling the one or more replacement tokens from a noise distribution.

11. The computer-implemented method of claim 1, wherein the machine-learned language encoder model comprises a transformer network text encoder.

12. The computer-implemented method of claim 1, wherein, when one of the replacement tokens is equal to the original token it replaces, the loss function evaluates such replacement token as if it was included in the original input tokens.

13. The computer-implemented method of claim 1, wherein:
   the one or more training iterations comprise one or more pre-training iterations; and
   the method further comprises, after the one or more pre-training iterations:
      performing one or more fine-tuning training iterations in which the machine-learned language encoder model is trained to perform a language task.

14. The computer-implemented method of claim 1, wherein the plurality of original input tokens comprise a plurality of original words.

15. A computing system for fine-tuning a machine-learned language encoder model, the computing system comprising:
   one or more processors; and
   one or more non-transitory computer-readable media that store:
      a machine-learned language encoder model, the machine-learned language encoder model having been pre-trained by performance of pre-training operations, the pre-training operations comprising:
         obtaining an original language input that comprises a plurality of original input tokens;
         selecting one or more of the plurality of original input tokens to serve as one or more masked tokens;
         generating one or more replacement tokens, wherein the one or more replacement tokens comprise alternative natural language tokens;
         respectively replacing the one or more masked tokens in the original language input with the one or more replacement tokens to form a noised language input that comprises a plurality of updated input tokens, the plurality of updated input tokens comprising a mixture of the one or more replacement tokens and the original input tokens that were not selected to serve as masked tokens;

processing the noised language input with the machine-learned language encoder model to produce a respective prediction for each updated input token included in the plurality of updated input tokens, wherein the prediction produced by the machine-learned language encoder model for each updated input token predicts whether such updated input token is one of the original input tokens or one of the replacement input tokens; and training the machine-learned language encoder model based at least in part on a loss function that evaluates the plurality of predictions produced by the machine-learned language encoder model; and instructions that, when executed by the one or more processors, cause the computing system to perform one or more fine-tuning training iterations in which the machine-learned language encoder model is trained to perform a language task.

16. The computing system of claim 15, wherein the one or more non-transitory computer-readable media further store instructions for performing the pre-training operations.

17. The computing system of claim 15, wherein the one or more non-transitory computer-readable media further store the machine-learned language generator model.

18. One or more non-transitory computer-readable media that store a machine-learned language encoder model, the machine-learned language encoder model having been trained by performance of operations, the operations comprising:

obtaining an original language input that comprises a plurality of original input tokens;

selecting one or more of the plurality of original input tokens to serve as one or more masked tokens;

generating one or more replacement tokens, wherein the one or more replacement tokens comprise alternative natural language tokens;

respectively replacing the one or more masked tokens in the original language input with the one or more replacement tokens to form a noised language input that comprises a plurality of updated input tokens, wherein the plurality of updated input tokens comprises the one or more replacement tokens and the plurality of original input tokens that were not selected to serve as masked tokens;

processing the noised language input with the machine-learned language encoder model to produce a respective prediction for each updated input token included in the plurality of updated input tokens, wherein the prediction produced by the machine-learned language encoder model for each updated input token predicts whether such updated input token is one of the original input tokens or one of the replacement input tokens; and training the machine-learned language encoder model based at least in part on a loss function that evaluates the plurality of predictions produced by the machine-learned language encoder model.

19. The one or more non-transitory computer-readable media of claim 18, wherein generating the one or more replacement tokens comprises generating the one or more replacement tokens using a machine-learned language generator model.

20. The one or more non-transitory computer-readable media of claim 18, wherein the machine-learned language generator model comprises a masked language model that has been trained to predict the one or more masked tokens.

* * * * *